United States Patent [19]

Gunning

[11] 4,285,228
[45] Aug. 25, 1981

[54] CRIMPING MACHINE FOR HOSE ASSEMBLY

[75] Inventor: David W. Gunning, Libertyville, Ill.

[73] Assignee: Anchor Coupling Co., Inc., Libertyville, Ill.

[21] Appl. No.: 67,954

[22] Filed: Aug. 20, 1979

[51] Int. Cl.³ .............................................. B21D 39/00
[52] U.S. Cl. ......................................... 72/402; 29/237
[58] Field of Search ............ 72/402, 410, 416, 453.03; 29/237, 517

[56] References Cited

U.S. PATENT DOCUMENTS

| | | | |
|---|---|---|---|
| 3,706,123 | 12/1972 | Whitledge | 29/237 |
| 3,762,209 | 10/1973 | Herndon | 29/237 |
| 3,849,858 | 11/1974 | Whitledge | 29/237 |
| 4,034,592 | 7/1977 | Chen | 72/402 |
| 4,034,593 | 7/1977 | Patel | 72/402 |
| 4,107,964 | 8/1978 | Smith | 72/402 |

FOREIGN PATENT DOCUMENTS

2434683  6/1975  Fed. Rep. of Germany .............. 72/402

OTHER PUBLICATIONS

"FT1204 Crimped Hose Assembly Machine" Illustrated in "Aeroquip Industrial Engineering Bulletin," No. 196, Copyright 1975.

*Primary Examiner*—Nicholas P. Godici
*Assistant Examiner*—Gene P. Crosby
*Attorney, Agent, or Firm*—Ronald A. Sandler; Richard A. Craig

[57] ABSTRACT

There is disclosed a machine for crimping a coupling onto the end of a hose over which the coupling is coaxially fitted. The hose and coupling are inserted through an annular crimping head and positioned on a coupling support. Two semicircular arrays of circumferentially spaced-apart crimping dies are respectively carried by two pivotally mounted part-cylindrical die-holding jaws which open to facilitate insertion of the hose and coupling and close to form a circular array of dies surrounding the coupling, each die being radially slidably movable with respect to the associated holding jaw. As a hydraulic drive cylinder draws the crimping head toward the dies, cam means close the die-holding jaws and the crimping head then moves into surrounding camming engagement with the dies for moving them radially inwardly into crimping engagement with the coupling. A safety valve limits the force applied to the crimping head until the die-holding jaws have closed.

22 Claims, 14 Drawing Figures

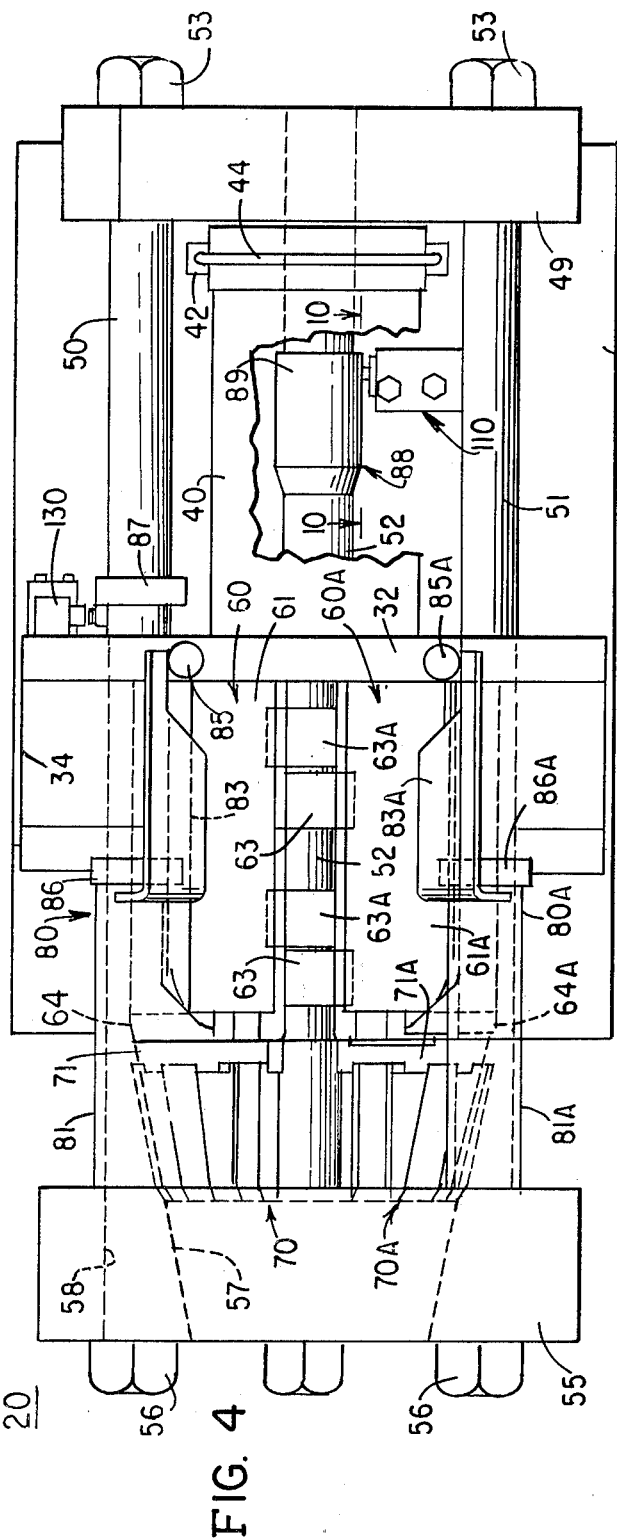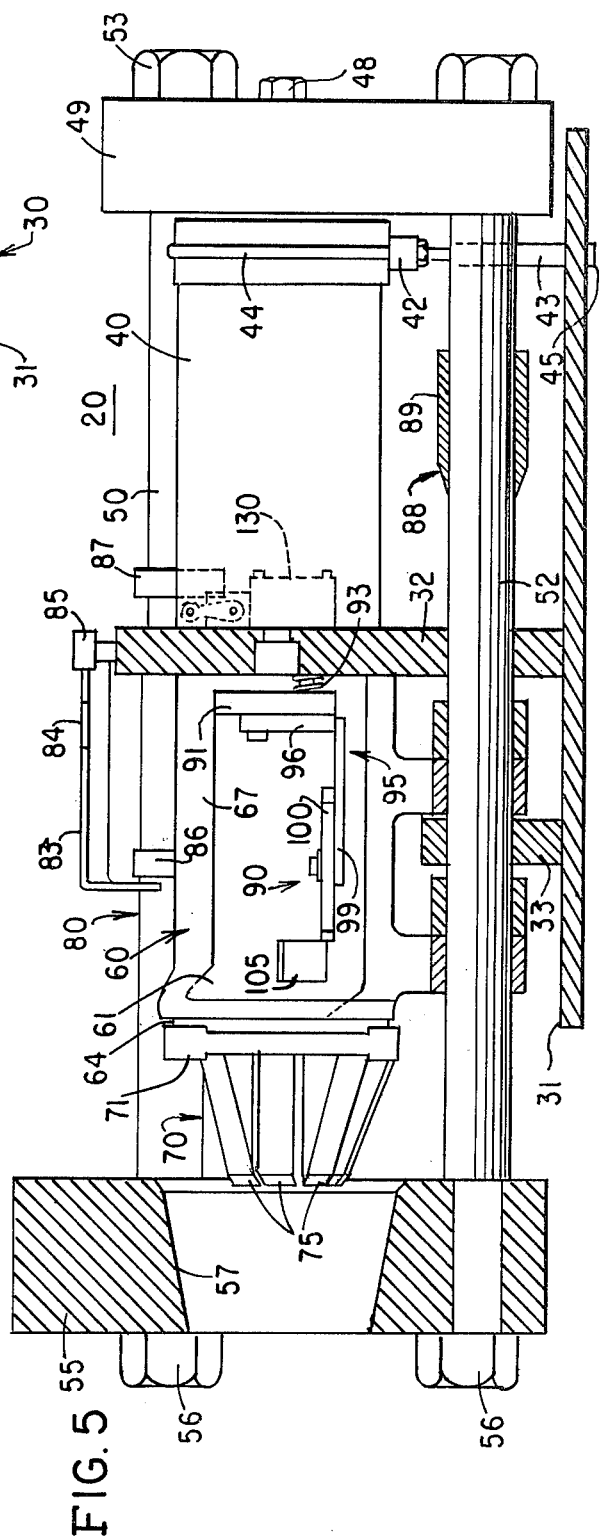

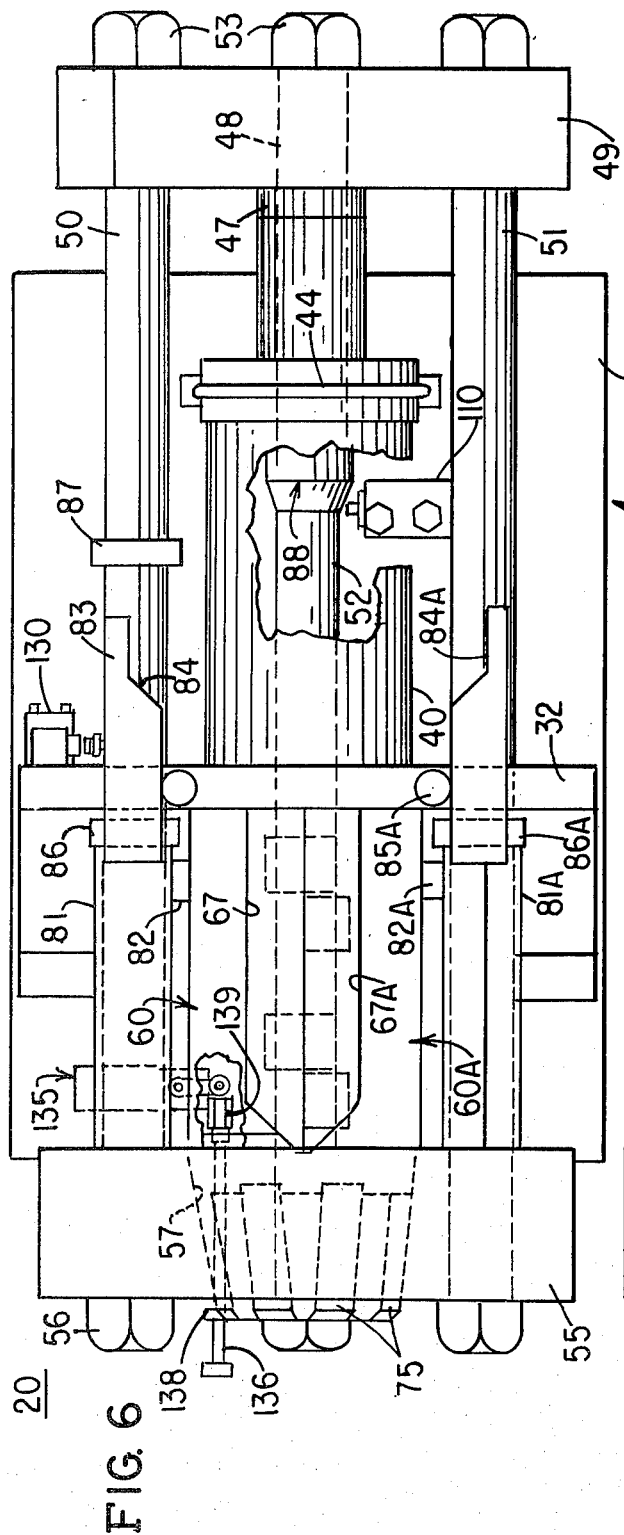
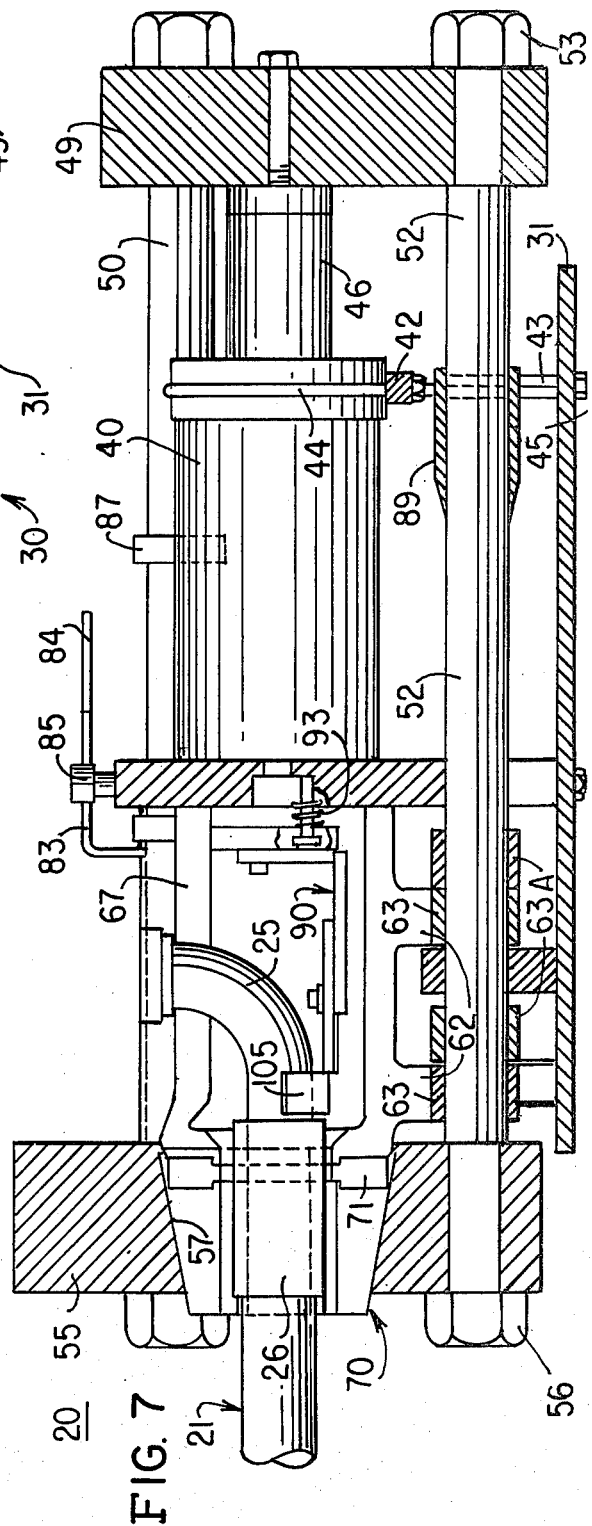
FIG. 6
FIG. 7

CRIMPING MACHINE FOR HOSE ASSEMBLY

BACKGROUND OF THE INVENTION

The present invention relates to a machine for field application of crimping couplings to hose ends. More particularly, the present invention relates to machines for crimping a metallic coupling onto the end of a hose over which the coupling is coaxially fitted.

Prior crimping apparatus is, in general, well known in the art and is exemplified by the FT1204 Crimped Hose Assembly Machine manufactured by Aeroquip Corporation. In such prior art machines the coupling and hose assembly are inserted into the machine through a circular crimping head and thence into the coaxially aligned circular array of crimping dies. The coupling typically has a relatively small diameter portion to be crimped which is to be disposed closely adjacent to the crimping dies when the coupling is mounted within the die array. But the coupling typically also has larger diameter portions such as coupling flanges, or the coupling may be disposed in the form of an elbow having portions extending at an angle from the axis of the portion to be crimped, and there is thus the problem of inserting a member having relatively large dimensions into a die array having a relatively small inner diameter.

To allow the coupling to be inserted into and removed from the crimping die array, some prior art machines have provided for the dies to be individually removable, but such arrangements are time consuming because typically several of the dies will have to be removed each time a coupling is inserted into the machine and the dies have to be removed again to permit the crimped coupling to be withdrawn from the machine.

Other prior art machines have provided for an increased range of radial motion of the dies, the dies being biased to a radially outward position to permit entry and withdrawal of the coupling, and being moved radially inwardly to the crimping position by camming engagement with the crimping head. In such arrangement the increased range of radial movement of the dies requires a relatively larger crimping head to provide the necessary camming surface dimensions, a provision which imposes a severe penalty in terms of size and weight. Also, this arrangement necessitates complicated mechanism for mounting the dies, biasing them to the open position and permitting their wide range of radial movement, which mechanism must also be designed to permit removal and replacement of the dies with dies of different size or configuration for different crimping applications.

Furthermore, the prior art machines typically utilize a number of dies, e.g., eight, in the crimping die array. The individual mounting of these dies necessitates that for replacement thereof each of the dies must individually be handled, a complicated and time-consuming procedure.

SUMMARY OF THE INVENTION

The present invention relates to an improved machine for crimping a coupling to the end of a hose over which the coupling is coaxially fitted, which machine avoids the disadvantages of prior art machines and affords important structural and operating advantages.

It is a general object of this invention to provide an apparatus of the type set forth which permits movement of the dies to accommodate entry and withdrawal of a coupling to be crimped, but without the need for any manual manipulation of the dies during insertion of the coupling and without significantly altering the extent of radial movement of the dies during the crimping operation.

Another object of this invention is to provide an apparatus of the type set forth which provides for mounting of the crimping dies on a movable die-holding mechanism which permits movement of a plurality of dies as a unit.

Another object of the invention is the provision of an apparatus of the type set forth which permits mounting and removal of a plurality of dies simultaneously as a unit.

Yet another object of the invention is the provision of an apparatus which permits movement of the crimping dies from an open condition to a closed condition prior to crimping engagement of the crimping head with the dies.

In connection with the foregoing object, it is another object of the invention to provide a safety mechanism to limit the force applied by the dies to the crimping head during the movement of the crimping dies from the open to the closed condition.

These and other objects of the invention are attained by providing apparatus for securing a coupling to the end of a hose over which the coupling is coaxially fitted, the apparatus comprising a frame, support means on the frame for supporting the associated coupling and hose in a predetermined configuration relative to the frame, die-holding means mounted on the frame and movable between an open condition accommodating movement of the associated coupling and hose to and from the predetermined configuration and a closed condition, crimping dies carried by the die-holding means for movement therewith and adapted for movement with respect thereto between a retracted configuration out of contact with the associated coupling and a crimping configuration adapted for crimping engagement with the associated coupling when the die-holding means is in the closed condition thereof, a crimping head carried by the frame and adapted for movement between a release position out of engagement with the crimping dies and a working position engaging the crimping dies for effecting movement thereof from the retracted configuration to the crimping configuration thereof, and drive means carried by the frame and coupled to the die-holding means for effecting movement thereof to the closed condition thereof and coupled to the crimping head for effecting movement thereof to the working position thereof thereby to effect crimping of the coupling onto the associated hose by the crimping dies.

Further features of the invention pertain to the particular arrangement of the parts of the crimping apparatus whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 4 is a top plan view of the crimping machine illustrated in FIG. 2;

FIG. 5 is a view in vertical section taken along the line 5—5 in FIG. 2;

FIG. 6 is a view similar to FIG. 4, but with the die-holding jaws closed and with the crimping head disposed in its working condition;

FIG. 7 is a view similar to FIG. 5, but illustrating the parts of the machine in the conditions shown in FIG. 6;

FIG. 8 is a front elevational view of one of the die-mounting plates of the present invention;

FIG. 9 is an enlarged view in vertical section taken along the line 9—9 in FIG. 8;

DESCRIPTION OF THE PREFERRED EMBODIMENT

Figure 1:
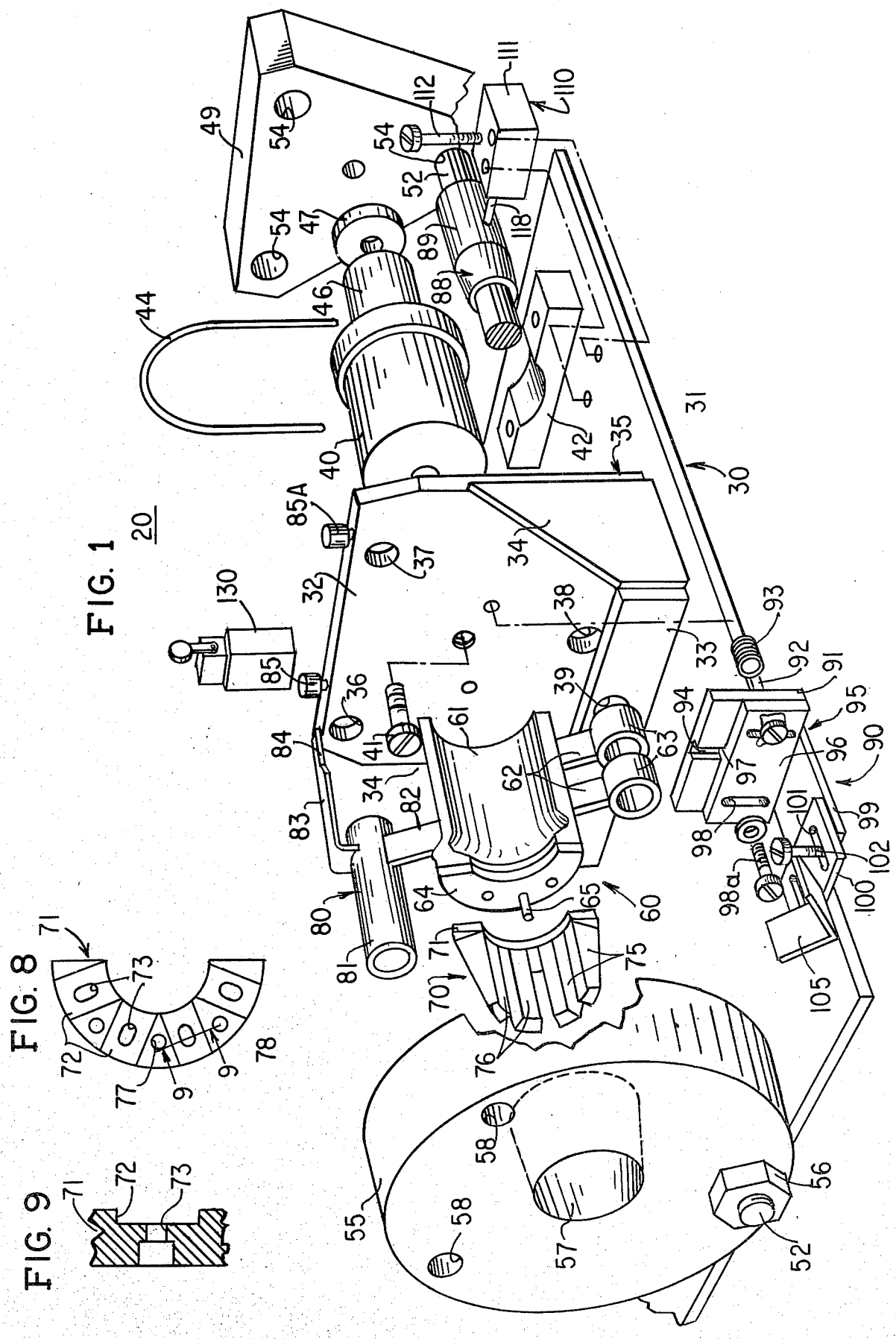
FIG. 1 is an exploded perspective view of crimping apparatus constructed in accordance with and embodying the features of the present invention.
Figure 2:
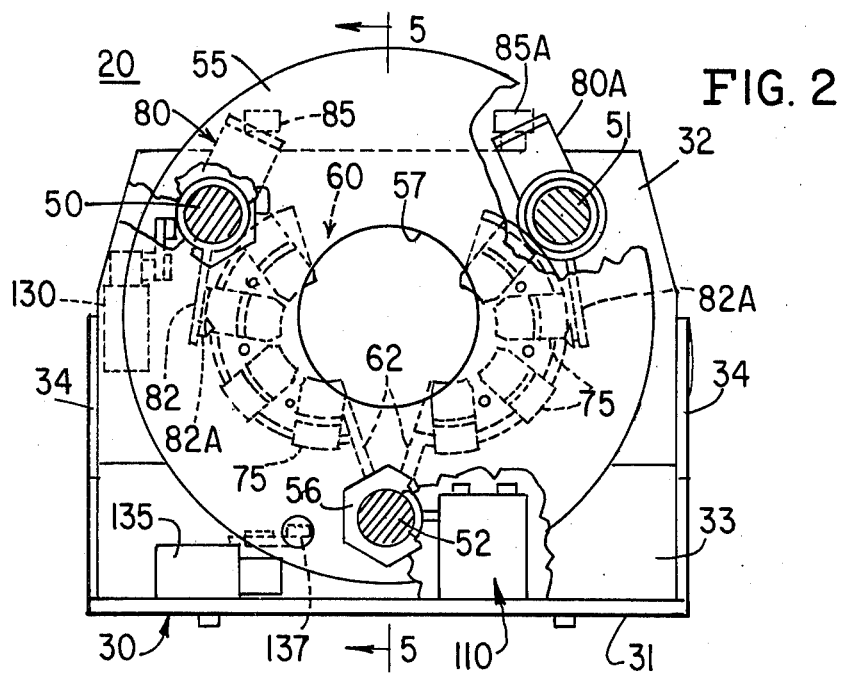
FIG. 2 is an end elevational view of the assembled machine of FIG. 1, as viewed from the left-hand end of FIG. 1, with the die-holding jaws in their open condition and with portions of the machine broken away more clearly to show the internal construction thereof.
Figure 3:
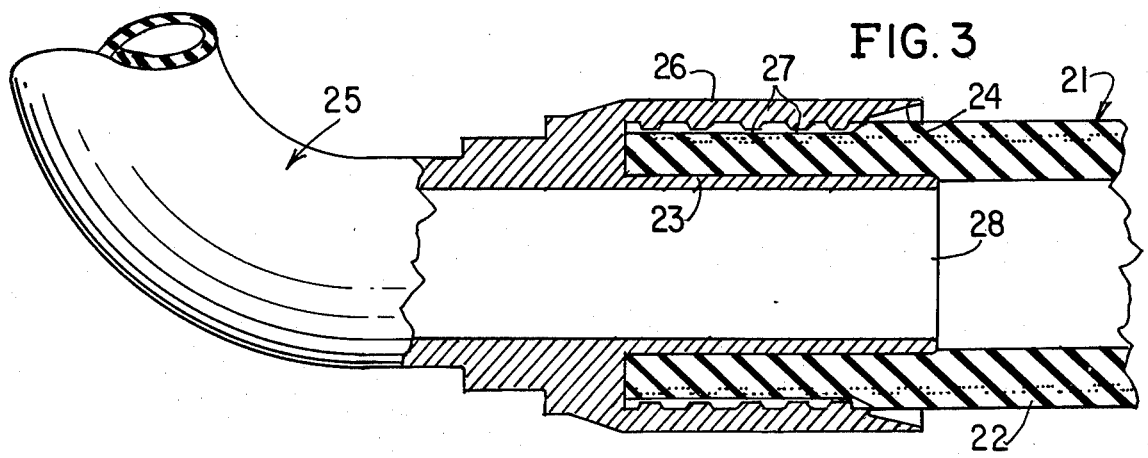
FIG. 3 is an enlarged fragmentary view in partial vertical section of a hose and coupling assembly prior to crimping thereof.

Referring now to FIGS. 1–3 of the drawings, there is illustrated a crimping machine, designated generally by the numeral 20, for securing a coupling 25 to the end of a hose 21. The hose 21 illustrated is a textile and wire reinforced hose, such as is used for high-pressure applications. In use, the outer layer 22 of insulation on the hose may be skived as at 23 at the end on which the coupling 25 is to be mounted. The coupling typically is metal and may be straight or elbow-shaped, an elbow version being illustrated in the drawings. The coupling 25 includes concentric outer and inner sleeves 26 and 28 which are joined at the inner ends thereof, the outer end of the outer sleeve 26 being inwardly tapered along the inner surface thereof as at 24 to form a frustoconical surface. Also formed on the inner surface of the outer sleeve 26 are a plurality of circumferentially extending and longitudinally spaced-apart annular ribs 27 which project radially inwardly toward the inner sleeve 28.

In use, the coupling 25 is first assembled on the end of the hose 21, as in FIG. 3, by press-fitting the inner sleeve 28 into the hose 21, with the outer sleeve 26 telescopically surrounding the end 23 of the hose 21. It will be appreciated that the coupling 25 is dimensionally mated to the hose 21, there typically being provided a variety of sizes of couplings 25 corresponding respectively to different sizes of hose 21. In the illustrated embodiment the outer diameter of the inner sleeve 28 of the coupling 25 is substantially equal to the inner diameter of the hose 21 and is press- or force-fitted thereinto, thereby providing a snug fit of the inner sleeve 28 within the hose 21. It will be understood that the present invention also is useful with couplings that are not a press fit. When the hose 21 and coupling 25 are thus assembled, as illustrated in FIG. 3, they are ready for insertion into the crimping machine 20 for performance of the crimping operation, as will be explained more fully below.

Referring now also to FIGS. 2 and 4 through 7 of the drawings, the crimping machine 20 has a frame, generally designated by the numeral 30, which includes a flat rectangular base plate 31 on which is mounted the bolster assembly 35. The bolster assembly 35 includes a generally rectangular support plate 32 fixedly secured to the base plate 31 intermediate the ends thereof and extending upwardly therefrom substantially normal thereto, and a rectangular guide plate 33 spaced a predetermined distance forwardly of the support plate 32 and parallel thereto, but having a lesser vertical extent above the base plate 31. Interconnecting the support plate 32 and the guide plate 33 at the opposite side edges thereof are a pair of upstanding side plates 34. The support plate 32 has three circular apertures 36, 37 and 38 extending therethrough in a generally triangular pattern, the guide plate 33 having a circular aperture 39 therethrough aligned coaxially with the aperture 38 in the support plate 32.

Fixedly secured to the rear side of the support plate 32 is a hydraulic drive cylinder 40. More particularly, a mounting bolt 41 (FIG. 2) extends through a complementary aperture in the support plate 32 and is threadedly engaged with the end wall of the drive cylinder 40 substantially coaxially therewith. The rod end of the drive cylinder 40 rests in a cradle block 42, which is spaced above the base plate 31 by a pair of hollow spacers 43, the assembly being secured together by a U-bracket 44 which extends over the drive cylinder 40 and has externally threaded legs which respectively extend through complementary apertures in the mounting block 41, through the spacers 43 and complementary openings in the base plate 31, and are threadedly engaged with complementary nuts 45 at the underside of the base plate 31 for securing the assembly together. The drive cylinder 40 has a piston rod 46 which extends from the rear end thereof and is connected to an adapter 47 in which is threadedly engaged a bolt 48 received through a complementary opening centrally of a ram plate 49 for securing the ram plate 49 to the piston rod 46.

Respectively extending through the apertures 36–38 in the support plate 32 are three elongated tie rods 50, 51 and 52, the tie rod 52 also extending through the aperture 39 in the guide plate 33. The tie rods 50–52 extend the entire length of the base plate 31 and have the rear ends thereof provided with reduced diameter portions which respectively extend through complementary openings 54 in the ram plate 49, and are externally threaded for engagement with nuts 53 to secure the tie rods to the ram plate 49. Similarly, the forward ends of the tie rods 50–52 are provided with reduced diameter portions which respectively extend through complementary apertures 58 in an annular collet ring 55, which forms a crimping head for the machine 20, these reduced diameter portions being externally threaded for engagement with nuts 56 securely to fasten the tie rods 50–52 to the collet ring 55. The collet ring 55 has a central tapered aperture therethrough which defines a fructoconical inner cam surface 57 which is wider at the inner end thereof than at the outer end thereof.

The crimping machine 20 also includes a die holder assembly, generally designated by the numeral 60, which includes a pair of die-holding jaws 61 and 61A, which are constructed substantially as mirror images of each other, and only the die-holding jaw 61 will be described in detail, it being understood that like parts of the die-holding jaw 61A have like reference numerals, followed by the suffix A. The jaw 61 is generally semi-cylindrical in shape and is arranged with the axis thereof disposed substantially horizontally. Integral with the die-holding jaw 61 at the lower edge thereof and extending downwardly therefrom are two longitudinally spaced-apart pivot arms 62, each being integral at the distal end thereof with an annular pivot collar 63 disposed in surrounding relationship with the tie rod 52 for accommodating pivotal movement of the die-holding jaw 61 about the axis of the tie rod 52. The die-holding jaw 61A is similarly mounted for pivotal movement about the axis of the tie rod 52, with the pivot collars 63A being respectively disposed forwardly of the pivot collars 63. Fixedly secured to the arcuate forward edge of the die-holding jaw 61 is an arcuate attachment plate 64. Carried by the attachment plate 64 centrally thereof and projecting forwardly therefrom is a locating pin 65. The upper edge of the die-holding jaw 61 has a cutout or recess 67 formed therein.

The die-holding jaws 61 and 61A are pivotally movable between an open condition, illustrated in FIGS. 4 and 5, wherein the die-holding jaws 61 and 61A are spaced apart, and a closed condition, illustrated in FIGS. 6 and 7, wherein the edges of the die-holding jaw 61 are disposed closely adjacent to each other for cooperation to form a substantially cylindrical assembly coaxial with the collet ring 55, the recesses 67 and 67A cooperating to define an open area in the top of the cylindrical assembly, as can best be seen in FIG. 6.

There is also provided a die assembly which includes two subassemblies 70 and 70A arranged substantially as mirror images of each other and respectively adapted for mounting on the attachment plate 64 and 64A. Only the die assembly 70 will be described in detail, like parts of the subassembly 70A having like reference numbers followed by the suffix A. Referring also to FIGS. 8 and 9 of the drawings, the die subassembly 70 includes an arcuate mounting plate 71 having in one surface thereof a plurality of equiangularly spaced-apart shallow radial grooves 72 and a plurality of oval slots 73 extending through the mounting plate 71 and respectively disposed centrally of the grooves 72. Each of the slots 73 is countersunk at the end thereof opposite the grooves 72. Respectively slidably disposed in the grooves 72 and extending forwardly therefrom are a plurality of crimping dies 75, each of the dies 75 being fastened to the mounting plate 71 by a bolt (not shown) which extends through the corresponding slot 73, with the head thereof recessed in the countersunk portion of the slot 73 and with the shank thereof threadedly engaged in a mating aperture in the inner end of the die 75.

It will be appreciated that the dies 75 thus are fastened to the mounting plate 71 so that the elongated slots 73 permit movement of the bolts therein and a corresponding radial sliding movement of the dies 75 in the grooves 72. Each of the dies 75 is provided with an elongated concave die surface 76 at the radially inner side thereof adapted for engagement with an associated coupling 25 in a manner to be described more fully below.

The mounting plate 71 has a locating aperture 77 (FIG. 8) centrally thereof for receiving therethrough the locating pin 65 of the attachment plate 64, properly to position the die subassembly 70 on the attachment plate 64, the mounting plate 71 then being securely fastened to the attachment plate 64 by means of threaded fasteners extending through apertures 78 in the mounting plate 71. Preferably, four dies 75 are provided in each die assembly 70 and 70A, but it will be appreciated that any desired number could be provided, depending on the size and shape of the coupling 25 to be crimped. It also will be appreciated that when the die-holder assembly 60 is in its closed condition, the ends of the mounting plate 71 and 71A are in substantially abutting relationship and cooperate to define an annular mounting ring, and the dies 75 and 75A cooperate to define a substantially cylindrical configuration disposed in surrounding relationship with a portion of the associated coupling 25 to be crimped.

Respectively mounted on the tie rods 50 and 51 are two jaw-closing assemblies 80 and 80A which are arranged substantially as mirror images of each other, wherefore only the jaw-closing assembly 80 will be described in detail, like parts of the jaw-closing 80A bearing like reference numbers followed by the suffix A. The jaw-closing assembly 80 includes a cylindrical sleeve 81 disposed in surrounding relationship with the tie rod 50 between the collet ring 55 and the support plate 32. Integral with the sleeve 81 and extending downwardly therefrom is an elongated lever arm 82 provided at the lower end thereof with a coupling member 82a (see FIG. 2) disposed in engagement with the die-holding jaw 61. Also integral with the sleeve 81 and extending upwardly and rearwardly therefrom generally parallel to the axis thereof is an elongated cam arm 83 having a cam surface 84 on the inner edge thereof disposed for camming engagement with a cam roller 85 rotatably mounted on the upper edge of the support plate 32. Also disposed in surrounding relationship with the tie rod 50 is a set collar 86 (see FIG. 6) which is secured in position on the tie rod 50 by a suitable setscrew, and cooperates with the collet ring 55 for trapping the sleeve 81 therebetween.

In use, it will be appreciated that as the tie rods 50 and 51 move forwardly and rearwardly, the collet ring 55 and the set collars 86 and 86A cooperate to effect a corresponding movement of the jaw-closing assemblies 80 and 80A. More particularly, as the jaw-closing assemblies 80 and 80A move rearwardly of the machine 20, the camming engagement of the cam surfaces 84 and 84A with the cam rollers 85 and 85A serves to rotate the sleeves 81 and 81A for moving the lever arms 82 and 82A inwardly against the die-holding jaws 61 and 61A, effecting movement thereof to the closed condition thereof, illustrated in FIGS. 6 and 7. When the jaw-closing assemblies 80 and 80A move forwardly, the sleeves 81 and 81A are rotated back to their normal positions illustrated in FIGS. 1, 2, 4 and 5, for reopening the die-holder assembly 60.

A switch-actuating collar 87 is mounted on the tie rod 50, between the support plate 32 and ram plate 49, by means of a suitable setscrew. Fixedly secured to the tie rod 52 between the support plate 32 and the ram plate 49 is a cam sleeve 88 having a raised cam surface 89 thereon, the purpose of which will be described more fully below.

Mounted on the bolster assembly 35 between the die-holding jaws 61 and 61A is a coupling-support assembly, generally designated by the numeral 90 (FIGS. 1 and 5). The coupling-support assembly 90 includes a rectangular stop plate 91 fixedly secured by bolts 92 to the front surface of the support plate 32. Interposed between the stop plate 91 and the support plate 32 and respectively in surrounding relationship with the bolts 92 are compression springs 93 for cushioning the coupling-support assembly 90, as will be explained more fully below. Centrally formed in the front surface of the stop plate 91 is a vertically extending groove 94 in which is slidably received a rib or tongue 97 projecting from the rear surface of the vertical plate 96 of a stop bracket 95. The vertical plate 96 has two vertically elongated slots 98 extending therethrough adjacent to the opposite side edges thereof for respectively receiving therethrough two adjusting screws 98a (see FIG. 1) which are threadedly engaged in complementary openings in the stop plate 91. It will be appreciated that the slots 98 and the adjusting screws 98a permit vertical adjustment of the stop bracket 95 with respect to the stop plate 91.

The stop bracket 95 also includes a horizontal plate 99 integral with the vertical plate 96 at the lower edge thereof and extending forwardly therefrom substantially normal thereto. Overlying the horizontal plate 99 is a stop-slide plate 100 having a pair of elongated horizontal slots 101 extending therethrough respectively adjacent to the opposite side edges thereof. Respectively received through the slots 101 and threadedly engaged in complementary openings in the horizontal plate 99 are two adjusting screws 102 (see FIG. 1) which permit horizontal adjustment of the stop-slide plate 100 with respect to the stop bracket 95. Fixedly secured to the stop-slide plate 100 at the forward edge thereof and projecting upwardly therefrom is a V-shaped seat or cradle 105 for supporting an associated coupling 25.

In operation, the coupling-support assembly 90 is mounted between the die-holding jaws 61 and 61A, as best illustrated in FIGS. 5 and 7, for supporting on the seat 105 the portion of the associated coupling 25 just beyond the outer sleeve 26 which is to be crimped. When thus supported, the outer sleeve 26 is positioned between the two die subassemblies 70 and 70A for crimping engagement therewith as will be explained below.

Figure 11:
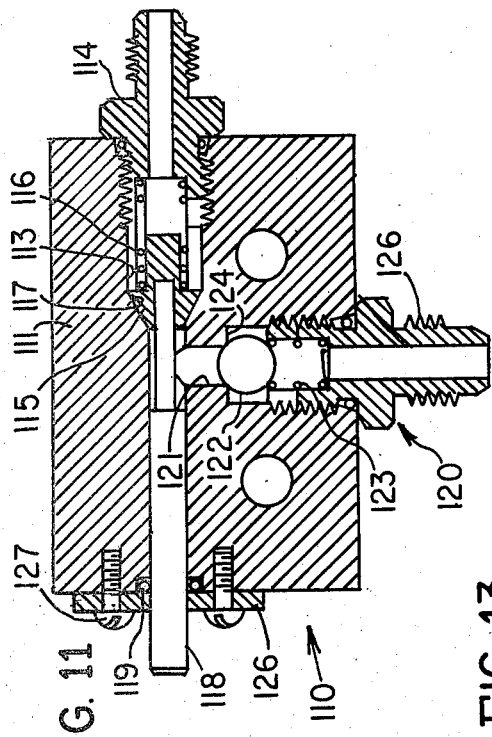
FIG. 11 is a view in vertical section taken along the line 11—11 in FIG. 10.
Figure 10:
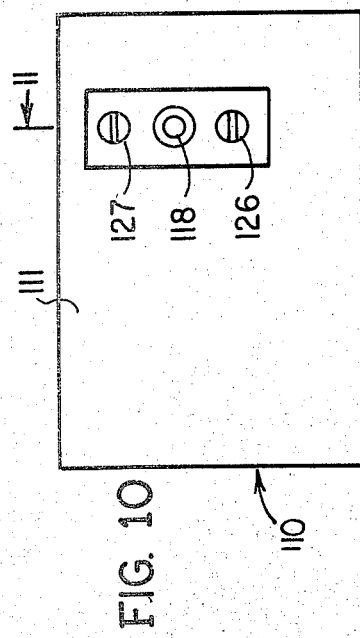
FIG. 10 is an enlarged view of the safety valve of the present invention, taken along the line 10—10 in FIG. 4.

Referring now also to FIGS. 10 and 11 of the drawings, there is provided a safety-valve assembly, generally designated by the numeral 110, which is mounted on the base plate 31 rearwardly of the support plate 32. More particularly, the safety-valve assembly 110 includes a valve block 111 secured to the base plate 31 by a pair of mounting screws 112. Extending horizontally through the block 111 is a main fluid passage 113 provided at one end thereof with a hydraulic fitting 114 for coupling to an associated hydraulic line. Disposed in the passage 113 is a poppet-type control valve member 115 which is disposed for engagement with a valve seat 117 and is resiliently urged to its closed position by a helical compression spring 116 disposed between the control valve member 115 and the fitting 114. Also fixedly secured to the control valve member 115 and extending from the other side thereof axially of the passage 113 is a plunger 118 which projects outwardly beyond the block 111 and is disposed in camming engagement with the cam sleeve 88. Disposed in surrounding relationship with the plunger 118 at the adjacent end of the passage 113 is an O-ring 119. The plunger 118 extends through a complementary opening in a seal plate 125 which is fixedly secured to the block 111 by mounting screws 127 and cooperates with the O-ring 119 to seal the outer end of the passage 113 around the plunger 118.

The safety-valve assembly 110 also includes a relief valve, generally designated by the numeral 120, which includes a passage 121 disposed at right angles to and communicating with the passage 113. Disposed in the passage 121 is a bearing ball 122 which is disposed for engagement with a seat 124 for forming the relief valve, the bearing ball 122 being resiliently urged to its closed condition by a helical compression spring 123 trapped between the ball 122 and a hydraulic fitting 126 which is mounted at the outer end of the passage 121. In operation, when the safety valve 115 is held open by depression of the plunger 118, the fluid pressure in the main passage 113 is limited by the relief valve 120. Thus, when this fluid pressure exceeds a predetermined maximum value, the relief valve 120 will open for dumping excess fluid to a reservoir.

Also mounted on the support plate 32 outboard of the tie rod 50 is a limit switch 130 having a contact arm disposed for engagement with the switch-actuating collar 87 on the tie rod 50. Also mounted on the base plate 31 between the collet ring 55 and the support plate 32 is a limit switch 135 having a contact arm which is disposed for engagement with the inner end of an adjusting screw 136 which is mounted in a complementary aperture 137 in the collet ring 55. The adjusting screw 136 is also provided with one or more spacers 139 and a locknut 138 for adjusting the effective length of the screw 136. In operation, as the collet ring 55 moves back and forth, the inner end of the adjusting screw 136 is moved into and out of engagement with the limit switch 135 for a purpose to be explained more fully below.

Figure 13:
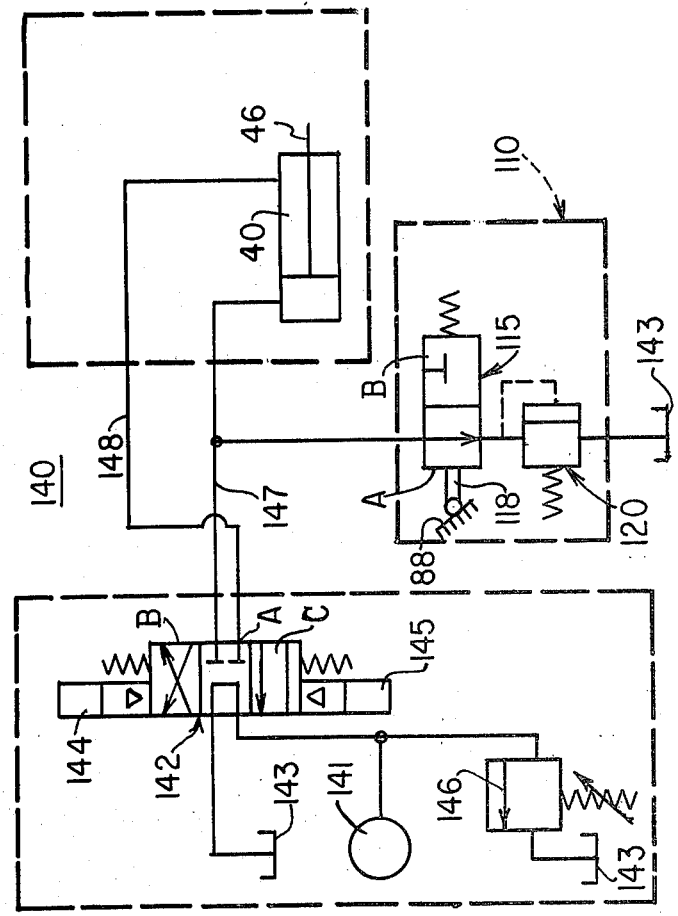
FIG. 13 is a schematic circuit diagram of the hydraulic control circuit of the present invention.

Referring now to FIG. 13 of the drawings, there is illustrated a hydraulic control circuit, generally designated by the numeral 140, for controlling the operation of the crimping machine 20. The hydraulic control circuit 140 includes a hydraulic pump 141 for pumping hydraulic fluid through the system to and from a suitable reservoir 143. The pump 141 drives the fluid first to a control valve 142, which preferably is a three-condition valve of the solenoid-actuated type, the three conditions including a neutral condition designated A and two operating conditions respectively designated B and C. The control valve 142 is provided with two coils 144 and 145 for respectively moving the control valve 142 to its two operating conditions, the valve being spring-biased to its neutral condition.

The control valve 142 is connected to the reservoir 133 in its neutral condition A, the valve also being coupled via conduits 147 and 148 to the piston and rod ends of the hydraulic drive cylinder 40. The conduit 148 also may be connected to a piston relief valve (not shown) which is spring-biased to a closed position and, when open, is connected to the reservoir 143. The conduit 147 is connected to the safety-valve assembly 110. More particularly, the conduit 147 is coupled to the main passage 113 of the control valve 115 via the fitting 114 (see FIG. 11). As explained above, the control valve 115 is cam-actuated and is spring-biased to its closed position. The relief valve 120 of the safety-valve assembly 110 is connected to the reservoir 143.

In operation, when the control valve 142 is in its neutral position A, the conduits 147 and 148 are blocked and the pump 141 is connected to the reservoir 143, the relief valve 146 limiting the pressure supplied to the control valve 142. When the control valve 142 is moved to its operating condition B, the pump 141 is connected to the conduit 147 for supplying pressurized hydraulic fluid to the piston end of the drive cylinder 40, thereby driving the piston rod 46 to the right, as viewed in FIGS. 3 and 12, thereby also driving the ram plate 49 and the tie rods 50–52 and the collet ring 55 to the right for performing a crimping operation. During the initial part of this movement of the piston rod 46, the control valve 115 of the safety-valve assembly 110 is held in its open position by the cam sleeve 88 and plunger 118, thereby providing communication with the relief valve 120 for limiting the pressure supplied to the piston end of the drive cylinder 40. When the piston rod 46 is moved a predetermined distance to the right, the plunger 118 rides off the high cam surface 89 of the cam sleeve 88, permitting the control valve 115 to return to its closed position under the urging of its bias spring, thereby isolating the relief valve 120, and permitting the pressure supplied to the piston end of the drive cylinder 40 to rise above the limit imposed by the relief valve 120. When the control valve 142 is moved to its operating condition C, the pump 141 is connected to the rod end of the drive cylinder 40 for retracting the piston rod 46, the pressure supplied being limited by the relief valve 146.

Figure 12:
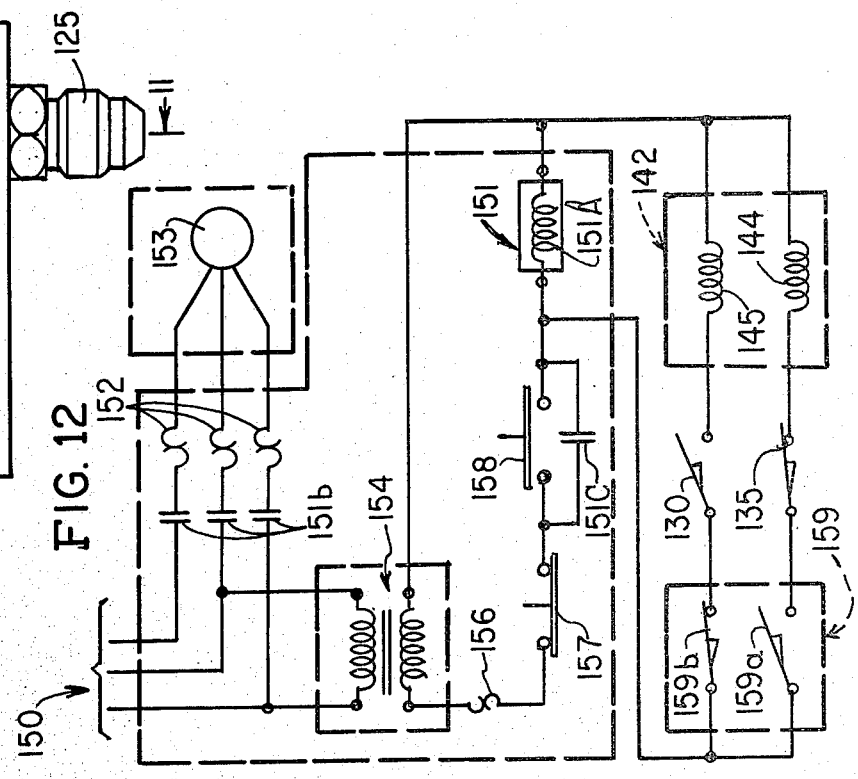
FIG. 12 is a schematic circuit diagram of the electrical control circuit of the present invention.

Referring now also to FIG. 12 of the drawings, there is illustrated the electric control circuit 150 for controlling the operation of the crimping machine 20. The electric control circuit 150 is connected to an associated source of 220/440 volt, 3-phase, 60 Hz electric power, the three conductors of which are respectively connected through three normally open contacts 151b of a relay 151 and through three circuit breakers 152 to the terminals of a pump motor 153 for driving the hydraulic pump 141. Connected across two of the conductors of the three-phase source is the primary winding of a stepdown transformer 154, providing 110 volts across its secondary. Connected across the secondary winding of the transformer 154 is the series combination of a circuit breaker 156, a manually operated main power switch 157, a manual normally open ON-OFF switch 158 and the coil 151a of the relay 151. Connected in parallel with the ON-OFF switch 158 are the normally open contacts 151c of the relay 151. Connected in parallel with the winding 151a of the relay 151 is the series combination of the normally open pole 159a of a single-pole double-throw foot-operated switch 159, the normally closed limit switch 135 and the forward solenoid winding 144 of the control valve 142. Also connected in parallel with the winding 151a of the relay 151 is the series combination of the normally closed pole 159b of the foot-operated switch 159, the normally open limit switch 130 and the return solenoid winding 145 of the control valve 142.

Referring now in particular to FIGS. 2 through 7, 12 and 13 of the drawings, the operation of the crimping machine 20 will be described in detail. Initially, the hydraulic control circuit 140 and the electric control circuit 150 are in the conditions illustrated in FIGS. 12 and 13 and the mechanical parts of the crimping machine 20 are in the positions illustrated in FIGS. 2–5, i.e., with the piston rod 46 of the drive cylinder 40 fully retracted, the die-holder assembly 60 in its open condition and the collet ring 55 disposed forwardly in its release position. The dies 75 of the die subassemblies 70 and 70A are disposed radially outwardly of the mounting plates 71 and 71A, in their retracted configuration.

First, the operator momentarily depresses the ON-OFF switch 158 for energizing the relay 151, thereby closing the contacts 151b and 151c thereof, the latter contacts latching the relay 151 in its energized condition. The closure of the relay contacts 151b energizes the pump motor 153 for supplying pressurized hydraulic fluid to the control valve 142.

Initially, the coupling 25 is assembled on the end of a hose 21 in the manner illustrated in FIG. 3 and, then, the coupling end of the assembly is inserted through the central aperture in the collet ring 55, between the die subassemblies 70 and 70A and between the die-holding jaws 61 and 61A. The coupling 25 is mounted in the seat 105 of the coupling-support assembly 90, in the manner described above, with the closed end of the outer sleeve 26 of the coupling 25 abutting or closely adjacent to the forward edge of the seat 105. It will be appreciated that the pivoted open condition of the die-holder assembly 60 facilitates this insertion of the coupling and hose assembly into the crimping machine 20. When the coupling and hose assembly is thus mounted in place in the crimping machine 20, the machine is ready to be operated through a crimping cycle.

To begin a crimping cycle, the operator depresses the foot switch 159, thereby opening the pole 159b and closing the pole 159a for energizing the forward coil 144 of the control valve 142 and shifting it from its neutral condition A to its operating condition B. The foot switch 159 is held depressed until the crimping operation is complete. Shifting of the control valve 142 to its operating condition B connects the pump 141 to the piston end of the drive cylinder 40, and connects the rod end thereof to the reservoir 143 for driving the piston rod 146 in its forward or working direction, to the right, as viewed in FIGS. 3 and 12. This movement drives the ram plate 49 and the tie rods 50–52 and the collet ring 55 to the right, and the collet ring in turn moves the jaw-closing assemblies 80 and 80A to the right.

During the initial portion of this forward movement of the jaw-closing assemblies 80 and 80A, the cam arms 83 and 83A are rotated by the cam rollers 85 and 85A for moving the die-holder assembly 60 to its closed condition in the manner described above. The parts are arranged so that the die-holder assembly 60 has moved to its closed condition before the collet ring 55 moves into crimping engagement with the dies 75. It will be noted that when the die-holder assembly 60 moves to its closed condition, the recesses 67 and 67A thereof cooperate to form a top opening to accommodate the vertical portion of an elbow-shaped coupling 25. Also, the cam sleeve 88 and the safety-valve assembly 110 are so arranged that, immediately after the closure of the die-holder assembly 60, the plunger 118 is released from the high cam surface 89, allowing the control valve 115 to close.

Thus, it will be appreciated that until the die-holder assembly 60 has moved to its closed condition, the pressure exerted on the collet ring 55 by the drive cylinder 40 is limited to a predetermined pressure, e.g., 50 psi, by the limit valve 120 so that, during this initial rapid advance portion of the crimping cycle, the machine parts are protected from damage in the event that the machine is misloaded. After the die-holder assembly 60 is safely closed, however, the relief valve limit is removed to permit high crimping pressure to be applied to the drive cylinder 40. Also, it will be noted that initially the limit switch 130 is held in its open position by the switch-actuating collar 87. But as soon as the piston rod 46 begins its power stroke, the switch-actuating collar 87 is moved out of engagement with the limit switch 130, permitting it to close.

Figure 14:
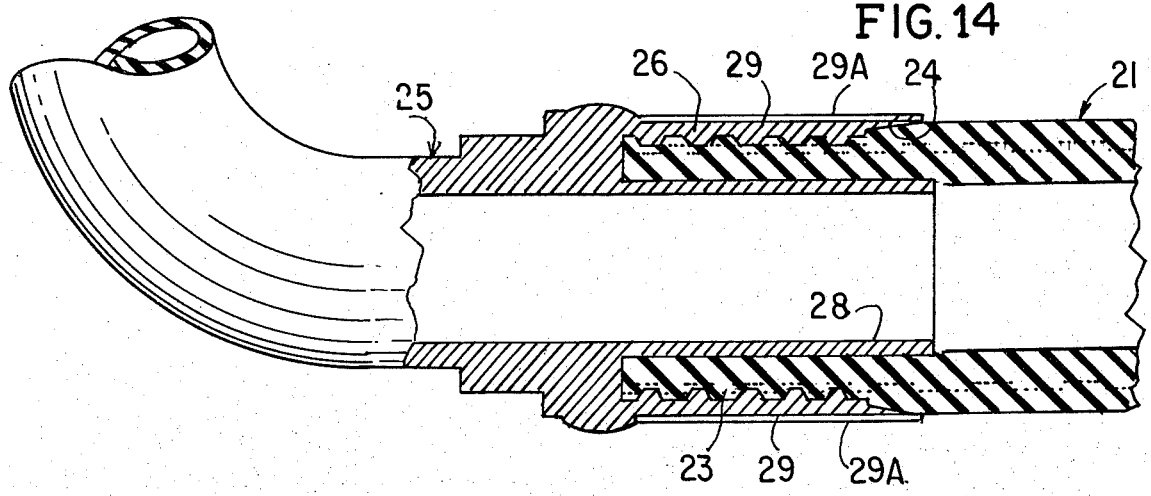
FIG. 14 is a view similar to FIG. 3, showing the hose and coupling assembly after crimping thereof by the crimping machine of the present invention.

As the piston rod 46 continues in the high-pressure portion of its power stroke, the frustoconical inner surface 57 of the collet ring 55 moves into camming engagement with the outer surfaces of the dies 75, thereby driving them radially inwardly in the grooves 72 into crimping engagement with the outer surface of the outer sleeve 26 of the coupling 25. The continued right-hand movement of the collet ring 55 results in a swaging action of the dies 75 on the coupling 25 for crimping the outer sleeve 26 thereof firmly into engagement with the hose 21 to form a secure joint, as illustrated in FIG. 14 of the drawings. More particularly, the outer sleeve 26 of the coupling 25 is driven radially inwardly until the tapered outer end 24 thereof is in firm engagement with the outer surface of the hose 21, and the ribs 27 are embedded in the end 23 of the hose 21. This swaging action results in the formation of swaged surfaces 29 on the outer surface of the outer sleeve 26, separated by ribs 29a defining the inter-die spaces. The right-hand movement of the collet ring 55 also tends to drive the coupling 25 horizontally against the seat 105 of the coupling-support assembly 90, this movement being cushioned by the springs 93.

At the end of the forward or power stroke of the piston rod 56, the adjusting screw 136 engages and opens the limit switch 135 for de-energizing the forward coil 144 of the control valve 142, thereby permitting it to return to its neutral position A for shutting off the supply of hydraulic fluid to the drive cylinder 40. When the operator observes that the motion of the crimping machine 20 has thus stopped, he releases the foot switch 159, thereby reopening the pole 159a thereof and reclosing the pole 159b thereof for energizing the return coil 145 of the control valve 142, thereby shifting it to its operating position C. In this latter operating position, the pump 141 is connected to the rod end of the drive cylinder 40, while the piston end thereof is connected to the reservoir 143, for retracting the piston rod 46, and thereby moving the tie rods 50–52 and the collet ring 55 to the left, i.e., back toward the release position thereof. During the retraction of the piston rod 46, the pressure of the fluid supplied to the drive cylinder 40 is limited by the relief valve 146 to prevent damage to the crimping machine 20.

As the collet ring 55 begins its movement toward its release position, the adjusting screw 136 disengages from the limit switch 135, permitting it to reopen, and the plunger 118 of the control valve 115 rides back up on the high cam surface 89 of the cam sleeve 88, thereby reopening the control valve 115. As the tie rods 50–52 move in the release direction, the jaw-closing assemblies 80 and 80A rotate back to their original positions and the die-holder assembly 60 falls back to its open condition under the urging of gravity. As the piston rod 56 completes its retraction stroke, the switch-actuating collar 87 reengages the limit switch 130 for reopening it and deenergizing the return coil 145 of the control valve 142, thereby allowing it to return to its neutral condition A and shutting off the supply of hydraulic fluid to the drive cylinder 40. At this point the retraction of the piston rod 46 stops and the crimping cycle is complete. The crimped hose and coupling assembly may then be removed from the crimping machine 20 through the central opening in the collet ring 55 and a new assembly may be inserted for the next crimping operation.

It is a significant feature and advantage of the present invention that the pivotal movement of the die-holder assembly 60 between open and closed conditions at a location below their mating engagement with the coupling, together with the radial movement provided by the die subassemblies, greatly facilitates the insertion of couplings into and withdrawal of couplings from the crimping machine 20 without necessitating undue radial movement, or removal of the dies 75. Also, when it is desired to change the dies 75, as for crimping different sizes or styles of couplings, the individual dies do not have to be removed, rather, only the two die mounting plates 71 and 71A need to be removed from the attachment plates 64 and 64A and then new die subassemblies can be substituted therefor; thus, only two units need to be replaced instead of eight. Furthermore, because the individual dies 75 do not have to be capable of a large radial movement, no complicated dismounting mechanism is necessary, nor are individual spring-biasing means for the dies needed.

It should also be understood that dies shorter than dies 75 can be mounted for smaller hose sizes; when this occurs there also will be a gap between the front face of the dies and the rear face of the conical opening 57. As an example, for $\frac{3}{4}$ and smaller hose the dies 75 would be 2" long and there would be a $2\frac{3}{8}$" gap; the gap facilitating placement of the coupling in position.

Further, the cam-operated check valve 115 with the coupled relief valve 120 which limits the pressure to a predetermined level of about 50 psi during the rapid-closing portion of the cycle, protects the machine from damage in the event the coupling is mis-loaded.

From the foregoing, it can be seen that there has been provided an improved crimping machine which greatly facilitates the loading and unloading of the machine and simplifies the operation thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for securing a coupling to the end of a hose over which the coupling is coaxially fitted, said apparatus comprising a frame, support means on said frame for supporting the associated coupling and hose in a predetermined configuration relative to said frame, a die-mounting member, a plurality of crimping dies carried by said die-mounting member for movement with respect thereto between a retracted configuration out of contact with the associated coupling and a crimping configuration adapted for crimping engagement with the associated coupling, means for mounting said die-mounting member and the dies carried thereby as a unit on said frame adjacent to said support means, a crimping head carried by said frame and adapted for movement between a release position out of engagement with said crimping dies and a working position engaging said crimping dies for effecting movement thereof from the retracted configuration to the crimping configuration thereof, and drive means carried by said frame and coupled to said crimping head for effecting movement thereof to the working position thereof thereby to effect crimping of the coupling onto the associated hose by said crimping dies.

2. The apparatus of claim 1, wherein said apparatus includes two said die-mounting members, each carrying a plurality of said crimping dies.

3. The apparatus of claim 1, wherein said crimping dies are arranged in a generally circular configuration and are movable substantially radially thereof.

4. The apparatus of claim 1, wherein said apparatus includes two said die-mounting members, each of said die-mounting members comprising an arcuate mounting plate, said mounting plates cooperating in use to form a substantially annular mounting ring for mounting said crimping dies in a substantially cylindrical configuration.

5. Apparatus for securing a coupling to the end of a hose over which the coupling is coaxially fitted, said apparatus comprising a frame, support means on said frame for supporting the associated coupling and hose in a predetermined configuration relative to said frame, die-holding means mounted on said frame and movable between an open condition accommodating placement and removal of the associated coupling and hose to and from said predetermined configuration on said support means and a closed condition, crimping dies carried by said die-holding means for movement therewith and adapted for movement with respect thereto between a retracted configuration out of contact with the associated coupling and a crimping configuration adapted for crimping engagement with the associated coupling when said die-holding means is in the closed condition thereof, a crimping head carried by said frame and adapted for movement between a release position out of engagement with said crimping dies and a working position engaging said crimping dies for effecting movement thereof from the retracted configuration to the crimping configuration thereof, and drive means carried by said frame and coupled to said die-holding means for first effecting movement thereof to the closed condition thereof and coupled to said crimping head for effecting movement thereof to the working position thereof thereby to effect crimping of the coupling onto the associated hose by said crimping dies after said die-holding means are in the closed condition.

6. The apparatus of claim 5, wherein said die-holding means is pivotally movable between the open and closed conditions thereof.

7. The apparatus of claim 5, wherein said die-holding means includes two holding members movable with respect to each other.

8. The apparatus of claim 5, wherein said drive means includes an electrically controlled fluid drive cylinder.

9. The apparatus of claim 5, wherein said support means includes stop means for limiting longitudinal movement of the hose and coupling during movement of said crimping head to its working position.

10. The apparatus of claim 5, wherein said crimping dies include means permitting limited radial movement thereof relative to the coupling when the crimping dies are in the crimping configuration.

11. Apparatus for securing a coupling to the end of a hose over which the coupling is coaxially fitted, said apparatus comprising a frame, support means on said frame for supporting the associated coupling and hose in a predetermined configuration relative to said frame, die-holding means mounted on said frame and movable between an open condition accommodating placement and removal of the associated coupling and hose to and from said predetermined configuration on said support means and a closed condition, crimping dies carried by said die-holding means for movement therewith and adapted for movement with respect thereto between a retracted configuration out of contact with the associated coupling and a crimping configuration adapted for crimping engagement with the associated coupling when said die-holding means is in the closed condition thereof, a crimping head carried by said frame and adapted for movement between a release position out of engagement with said crimping dies and a working position engaging said crimping dies for effecting movement thereof from the retracted configuration to the crimping configuration thereof, drive means carried by said frame and coupled to said crimping head for effecting movement thereof to the working position thereof, and means coupling said drive means to said die-holding means and responsive to operation of said drive means in moving said crimping head toward the working position thereof for effecting movement of said die-holding means to the closed condition thereof prior to arrival of said crimping head at its working position, whereby the coupling is crimped onto the associated hose by said crimping dies.

12. The apparatus of claim 11, wherein said coupling means includes a first cam means connected to said drive means for movement therewith and adapted for cammed movement with respect thereto, and second cam means carried by said frame for camming engagement with said first cam means to effect movement thereof with respect to said drive means to move said die-holding means to the closed condition thereof.

13. The apparatus of claim 11, wherein said drive means effects reciprocating movement of said crimping head between the release and working positions thereof, said coupling means being pivotally movable about an axis parallel to the direction of movement of said crimping head.

14. Apparatus for securing a coupling to the end of a hose over which the coupling is coaxially fitted, said apparatus comprising a frame, support means on said frame for supporting the associated coupling and hose in a predetermined configuration relative to said frame die-holding means mounted on said frame and movable between an open condition accommodating placement and removal of the associated coupling and hose to and from said predetermined configuration on said support means and a closed condition, crimping dies carried by said die-holding means for movement therewith and adapted for movement with respect thereto between a retracted configuration out of contact with the associated coupling and a crimping configuration adapted for crimping engagement with the associated coupling when said die-holding means is in the closed condition thereof and a coupling is on said support means, a crimping head carried by said frame and adapted for movement between a release position out of engagement with said crimping dies and a working position engaging said crimping dies for effecting movement thereof from the retracted configuration to the crimping configuration thereof, drive means carried by said frame and coupled to said die-holding means for effecting movement thereof to the closed condition thereof and coupled to said crimping head for effecting movement thereof to the working position thereof thereby to effect crimping of the coupling onto the associated hose by said crimping dies, and control means coupled to said drive means for limiting the driving force applied to said crimping head until said die-holding means has been moved to the closed condition thereof.

15. The apparatus of claim 14, wherein said drive means is fluid-actuated.

16. The apparatus of claim 14, wherein said drive means is fluid-actuated, said control means including a relief valve for limiting the fluid pressure applied to said drive means.

17. The apparatus of claim 14, wherein said drive means includes a fluid-actuated drive cylinder, said coupling means including a relief valve shunting the fluid path to said drive cylinder and responsive to fluid pressure in excess of a predetermined pressure for opening to bypass said drive cylinder and thereby limit the pressure supplied thereto, a control valve interposed between said relief valve and the main fluid path to said drive cylinder, and means holding said control valve open until said die-holding means is moved to the closed condition thereof for providing communication between the main fluid path and said relief valve thereby to enable said relief valve to respond to fluid pressure in said main fluid path.

18. The apparatus of claim 17, wherein said means for controlling said control valve includes cam means connected to said drive means.

19. Apparatus for securing a coupling to the end of a hose over which the coupling is coaxially fitted, said apparatus comprising a frame, support means on said frame for supporting the associated coupling and hose in a predetermined configuration relative to said frame, two part-cylindrical die-holding jaws mounted for pivotal movement about a common axis between an open condition accommodating placement and removal of the associated coupling and hose to and from said predetermined configuration on said support means and a closed condition substantially coaxial with each other and with the associated hose, two sets of crimping dies respectively carried by said die-holding jaws for pivotal movement therewith and adapted for movement with respect thereto radially thereof between a retracted configuration out of contact with the associated coupling and a crimping configuration adapted for crimping engagement with the associated coupling when said die-holding jaws are in the closed condition thereof, a crimping head carried by said frame and adapted for movement between a release position out of engagement with said crimping dies and a working position engaging said crimping dies for effecting movement thereof from the retracted configuration to the crimping configuration thereof, and drive means carried by said frame and coupled to said holding jaws for effecting movement thereof to the closed condition thereof and coupled to said crimping head for effecting movement thereof to the working position thereof thereby to effect crimping of the coupling onto the associated hose by said crimping dies.

20. The apparatus of claim 19, and further including two arcuate mounting plates respectively removably mounted on said die-holding jaws and cooperating when said die-holding jaws are in the closed condition thereof to form a substantially annular mounting ring, said sets of crimping dies being respectively carried by said mounting plates and slidably movable with respect thereto.

21. The apparatus of claim 19, wherein each of said mounting plates includes a plurality of spaced-apart radial grooves, said dies being respectively slidably received in said grooves.

22. Apparatus for securing a coupling to the end of a hose over which the coupling is coaxially fitted, said apparatus comprising a frame, support means on said frame for supporting the associated coupling and hose in a predetermined configuration relative to said frame, die-holding means mounted on said frame and movable between an open condition accommodating movement of the associated coupling and hose to and from said predetermined configuration and a closed condition, crimping dies carried by said die-holding means for movement therewith and adapted for movement with respect thereto between a retracted configuration out of contact with the associated coupling and a crimping configuration adapted for crimping engagement with the associated coupling when said die-holding means is in the closed condition thereof, a crimping head carried by said frame and adapted for movement between a release position out of engagement with said crimping dies and a working position engaging said crimping dies for effecting movement thereof from the retracted configuration to the crimping configuration thereof, drive means carried by said frame and coupled to said crimping head for effecting movement thereof to the working position thereof, means coupling said drive means to said die-holding means and responsive to operation of said drive means in moving said crimping head toward the working position thereof for effecting movement of said die-holding means to the closed condition thereof prior to arrival of said crimping head at its working position, and control means coupled to said drive means for limiting the driving force applied to said crimping head until said die-holding means has been moved to the closed condition thereof, whereby the coupling is crimped onto the associated hose by said crimping dies.

* * * * *